US012145168B2

(12) United States Patent
Pollok

(10) Patent No.: US 12,145,168 B2
(45) Date of Patent: Nov. 19, 2024

(54) PORTABLE LOCKING IRRIGATION SYSTEM

(71) Applicant: John M. Pollok, Santa Clarita, CA (US)

(72) Inventor: John M. Pollok, Santa Clarita, CA (US)

( * ) Notice: Subject to any disclaimer, the term of this patent is extended or adjusted under 35 U.S.C. 154(b) by 0 days.

(21) Appl. No.: 15/665,828

(22) Filed: Aug. 1, 2017

(65) Prior Publication Data

US 2018/0029057 A1 Feb. 1, 2018

Related U.S. Application Data

(60) Provisional application No. 62/369,641, filed on Aug. 1, 2016.

(51) Int. Cl.

*B05B 9/03* (2006.01)
*B05B 15/625* (2018.01)
*B05B 15/65* (2018.01)

(52) U.S. Cl.

CPC ............ *B05B 9/035* (2013.01); *B05B 15/625* (2018.02); *B05B 15/65* (2018.02)

(58) Field of Classification Search

CPC ... B05B 13/0278; B05B 15/62; B05B 15/625; B05B 15/65; B05B 15/658; B05B 9/035; A01G 25/02

USPC ......................... 239/200, 207, 273, 279, 600

See application file for complete search history.

(56) References Cited

U.S. PATENT DOCUMENTS

| | | | | | |
|---|---|---|---|---|---|
| 4,087,049 | A * | 5/1978 | Traina | B05B 15/622 | 239/267 |
| 4,691,942 | A * | 9/1987 | Ford | F16L 37/18 | 285/312 |
| 5,172,515 | A * | 12/1992 | Lapshansky, Sr. | B05B 15/622 | 47/48.5 |
| 5,273,214 | A * | 12/1993 | Huffstutler | B05B 15/628 | 239/279 |
| 5,685,488 | A | 11/1997 | Gwartney | | |
| 2007/0290071 | A1* | 12/2007 | Wang | B05B 1/1654 | 239/275 |
| 2013/0082124 | A1 | 4/2013 | Atwool et al. | | |
| 2013/0126643 | A1* | 5/2013 | McLarty | B05B 15/62 | 239/553 |
| 2015/0283572 | A1 | 10/2015 | Burrous et al. | | |

FOREIGN PATENT DOCUMENTS

| | | | | |
|---|---|---|---|---|
| CA | 2196609 | A1 * | 7/1998 | A01G 25/00 |

OTHER PUBLICATIONS

Rain Bird, “1/2 Riser Adapter with 1/4 Barb”, <https://web.archive.org/web/20150628040150/http://www.rainbird.com/homeowner/products/drip/RISMANIS.HTM> 1 page.*

Rain Bird, “Low-Volume Landscape Irrigation Design Manual”, 2000, 113 pp.*

Rain Bird; 1/2 Riser Adapter with 1/4 Barb; https://web.archive.org/web/20150628040150/http://www.rainbird.com/homeowner/products/drip/RISMAN1S.HTM; 1 page.

* cited by examiner

*Primary Examiner* — Cody J Lieuwen

(74) *Attorney, Agent, or Firm* — Avyno Law P.C.

(57) ABSTRACT

An above ground portable irrigation system is provided having at least one base assembly and/or at least one hub assembly, or any combination of at least one base and at least one hub assembly that are interconnected by hoses through cam-lock connections to provide irrigation to any area.

4 Claims, 9 Drawing Sheets

PORTABLE LOCKING IRRIGATION SYSTEM

CROSS-REFERENCE TO RELATED APPLICATIONS

This application claims priority to U.S. Provisional Patent Serial Application No. 62/369,641, filed Aug. 1, 2016, titled PORTABLE LOCKING IRRIGATION SYSTEM, which is incorporated by reference in this application in its entirety.

FIELD OF THE INVENTION

The invention generally relates to an irrigation system and more particularly, to an aboveground portable locking irrigation system.

BACKGROUND OF THE INVENTION

Systems for providing irrigation to an area are known. Most irrigation systems are located underground. Underground irrigation systems, however, are difficult to design, implement and maintain. In particular, installing an underground irrigation system requires digging trenches in the ground, which may be cumbersome, time-consuming, or expensive for the consumer to establish, especially on sloped terrain or in areas comprised hard dirt, rocks, or heavy roots. Also, the sprinkler heads in underground irrigation systems could be a safety hazards if the grounds are heavily traveled or used for certain sports. In additional to creating a safety hazard, sprinkler heads in underground systems could also interfere with the use of the grounds, thereby limiting the ability of grounds owners to install underground irrigation system. Furthermore, once in the ground, any leaks or repairs/fixtures of irrigation parts are difficult to mend and most importantly, underground irrigation systems are not easily portable should it become desirable to move or relocate sprinkler heads.

In particular, with regard to providing irrigation to golf courses, underground irrigation systems may disrupt or disturb playability due to the presence of sprinkler heads fixed on the golf course. The playability on other sports fields such as football fields, soccer fields or baseball fields may also be compromised by the presence of an underground irrigation system. Additionally, most irrigation systems require primer and solvent cement to make connections between irrigation pipes, hoses and sprinkler heads, making assembling and disassembling of irrigation systems cumbersome and time-consuming.

Thus, a need exists for an above ground portable irrigation system that provides quick lock connections between pipes, hoses, and sprinkler heads for easy and quick assembly and disassembly, which can be used to irrigate any area or terrain and that does not disrupt the playability of sports games.

SUMMARY

As illustrated further in the following pages, the present invention relates to a portable locking/quick release irrigation system. The irrigation system may include at least one base assembly, at least one hub assembly or a combination of both. The base and hub assemblies may be used together, in series or parallel. Each base and/or hub assembly includes a base or hub having a perimeter channel and at least one central channel for directing fluid to flow through the base/hub assembly. While the base is described below as having an inlet and outlet opening and a hub is described as having more than one outlet opening, those skilled in the art will recognize that the term "base", as used in this application and claims, may be used to describe either the base or the hub, as the hub is merely a multiple of certain features of a base.

Each base includes two openings, an inlet opening and outlet opening, for receiving and discharging fluid. One opening is positioned on one side of the base, at the center of the side of the base and the other opening is positioned on the opposite side of the base. Each hub may include two pairs of opposing openings, where one opening is an inlet opening and is positioned in the center on one side of the hub and the other three openings are outlet openings. Each base and hub also includes a fluid irrigation opening located on the central channel that extends upward and functions as a mount for receiving a fluid discharging device for irrigating the area around or near the base and/or hub. As described further below, the fluid discharging device may be, for example, a sprinkler head or drip emitter. The bases can be connected in series. The hubs allow for the series connections to become parallel connections and/or allow the series connections to turn at ninety degree angles.

All openings on the base may be connected to hoses and/or fluid discharging device head through cam-lock connectors. The cam-lock connectors comprise of a cam and groove fitting, as illustrated and described further in the following pages. The base may have two cam-lock connectors (one male and one female) for connecting to hoses and one cam-lock connector for connecting a fluid discharging device, whereas a hub may include four cam-lock connectors (two male and two female) to accept male and female cam lock connectors on the hoses. Cam-lock connectors, when not in use, may be plugged or capped by a plug or cap. By capping two opposing cam locks on a hub, the hub can operate as a single base.

The portable irrigation system of the present invention may be sold as part of a complete system having hoses of pre-set lengths to interconnect devices at predetermined distances such that the fluid discharging devices provide complete coverage over the watering area. For example, if a hub or base has a sprinkler head with a 30 foot spray, the hose between the hubs may likewise be set at a predetermined distance of 30 feet to provide uniform and complete coverage for the system.

The cam-lock connectors provide a unique aspect to the system allowing for the fluid discharging devices and hoses to be quickly connected and disconnected from the openings on the hub/base and to quickly connect and disconnect the sprinkler heads to the hub/base. A full description of the specifications for the base, hub and system kit, as well as the cam-lock connectors used in connection with the portable irrigation system of the present invention, are all found in the following pages.

Other devices, apparatus, systems, methods, features and advantages of the disclosure will be or will become apparent to one with skill in the art upon examination of the following figures and detailed description. It is intended that all such additional systems, methods, features and advantages be included within this description, and be protected by the accompanying claims.

BRIEF DESCRIPTION OF THE FIGURES

The invention may be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1:
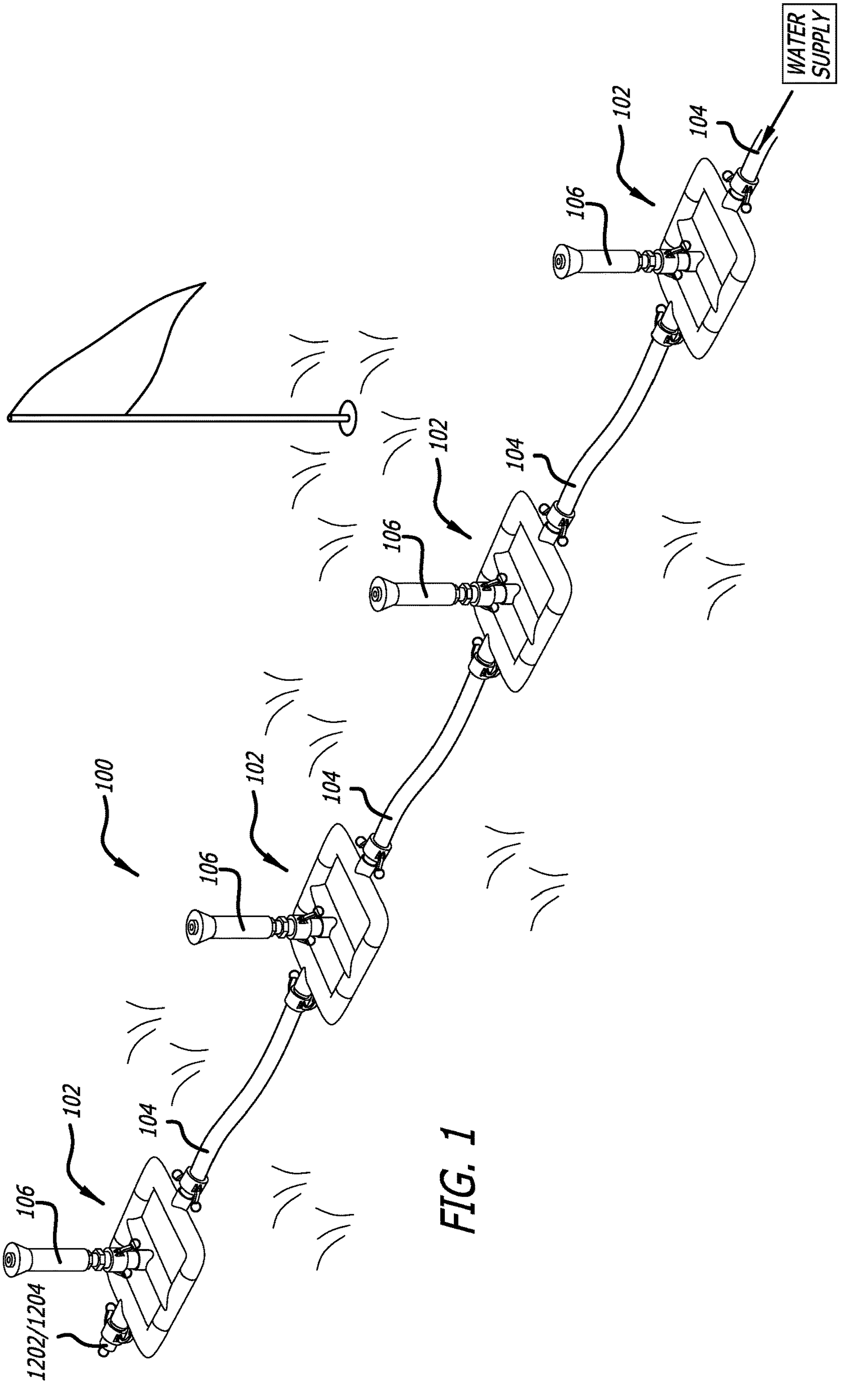
FIG. 1 is a perspective view of one example of an irrigation system having a plurality of interconnected base assembles.

FIGS. 1-12 illustrate various examples of different implementations of a portable, aboveground irrigation system 100, 200, 300, 1200. As will be explained further below, the irrigation system 100, 200, 300, 1200 of the present invention includes a number of different components that may be interchangeably used based upon the application.

In its most simplistic form, the irrigation systems 100, 200, 300, 1200 of the present invention interpose base assemblies 102 and/or hub assemblies 202 (i.e., irrigation assemblies) between hoses 104 of predetermined lengths to provide irrigation along the length of the assembled hoses. The base assemblies 102 and hub assemblies 202 are supplied with water through at least one hose connected to the base assembly 102 or hub assembly 202. Each base assembly 102 and hub assembly 202 includes a sprinkler head 106 for dispersing water from the base assembly 102 and/or hub assembly 202. Each base assembly 102 provides one water inlet and one water outlet connection to connect a number of base assemblies 102 in series; whereas, the hub assemblies 202 provide one water inlet connection and three water outlet connections to expand the irrigation system in both the longitudinal and latitudinal directions (i.e., to create both series and parallel connections between assemblies 102, 104).

The water supplied to each base or hub assembly 102, 202 provides water for the operation of the sprinkler head 106 on the assembly 102, 202 for watering the area surrounding the base or hub assembly 102, 202. Water provided to the base or hub assembly 102, 202 may then flow through the base or hub assembly 102, 202 toward a water outlet. The water flowing to an outlet may be used to supply another base or hub assembly 102, 202 through a hose 104 connected to the water outlet. Optionally, the water outlet may be capped by a cap or plug 1202, 1204 to prevent water from flowing out of the outlet and to cap the system at a given connection.

As will be illustrated and explained in more detail below in connection with FIGS. 1-12, the present invention enables a user to place sprinklers 106 at different locations through the interconnection of hoses 104, base assemblies 102 and/or hub assemblies 202, such that water dispersed from the sprinklers 106 can be applied over large areas in a manner that enables the irrigation or sprinkler system to be portable and easily removed from the area when not in use.

For example, FIG. 1 is a perspective view of one example of an irrigation system 100, illustrating the use of the multiple base assemblies 102 interconnected in series by hoses 104. As illustrated in FIG. 1, the portable irrigation system 100 may include one or more base assemblies 102 having sprinkler heads 106 connected thereto in series by a plurality of hoses 104. The plurality of base assemblies 102 may all connect at one point of connection to a water supply.

Figure 2:
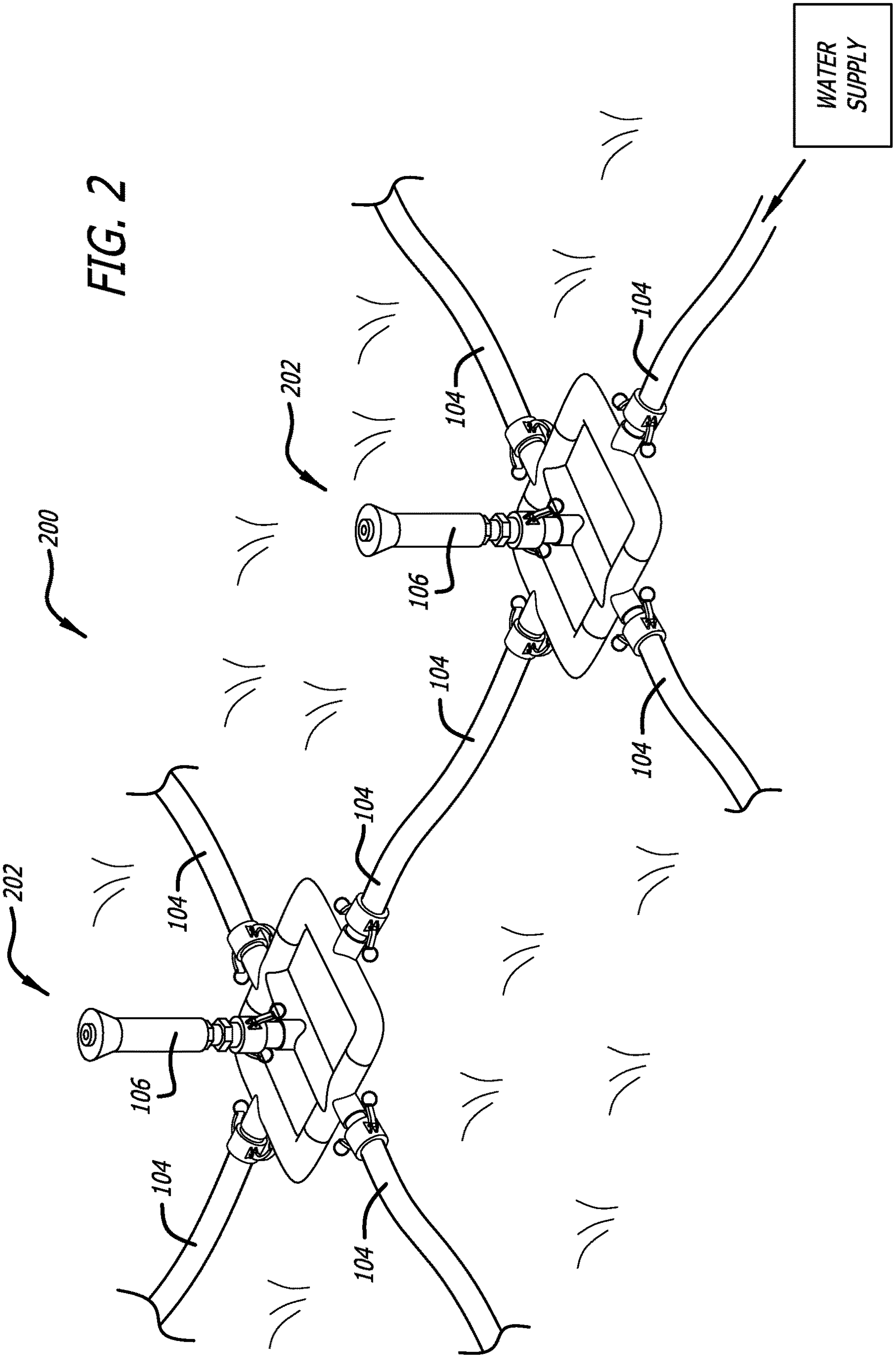
FIG. 2 is a perspective view of one example of an irrigation system having a plurality of interconnected hub assemblies.

FIG. 2 is a perspective view of another example of an irrigation system 200, illustrating the use of the multiple hub assemblies 202 interconnected in series or parallel by hoses 104. As illustrated in FIG. 2, the portable irrigation system 200 may include one or more hub assemblies 202 having sprinkler heads 106 connected thereto in series or parallel by a plurality of hoses 104. The plurality of hub assemblies 202 may all connect at one point of connection to a water supply.

Figure 3:
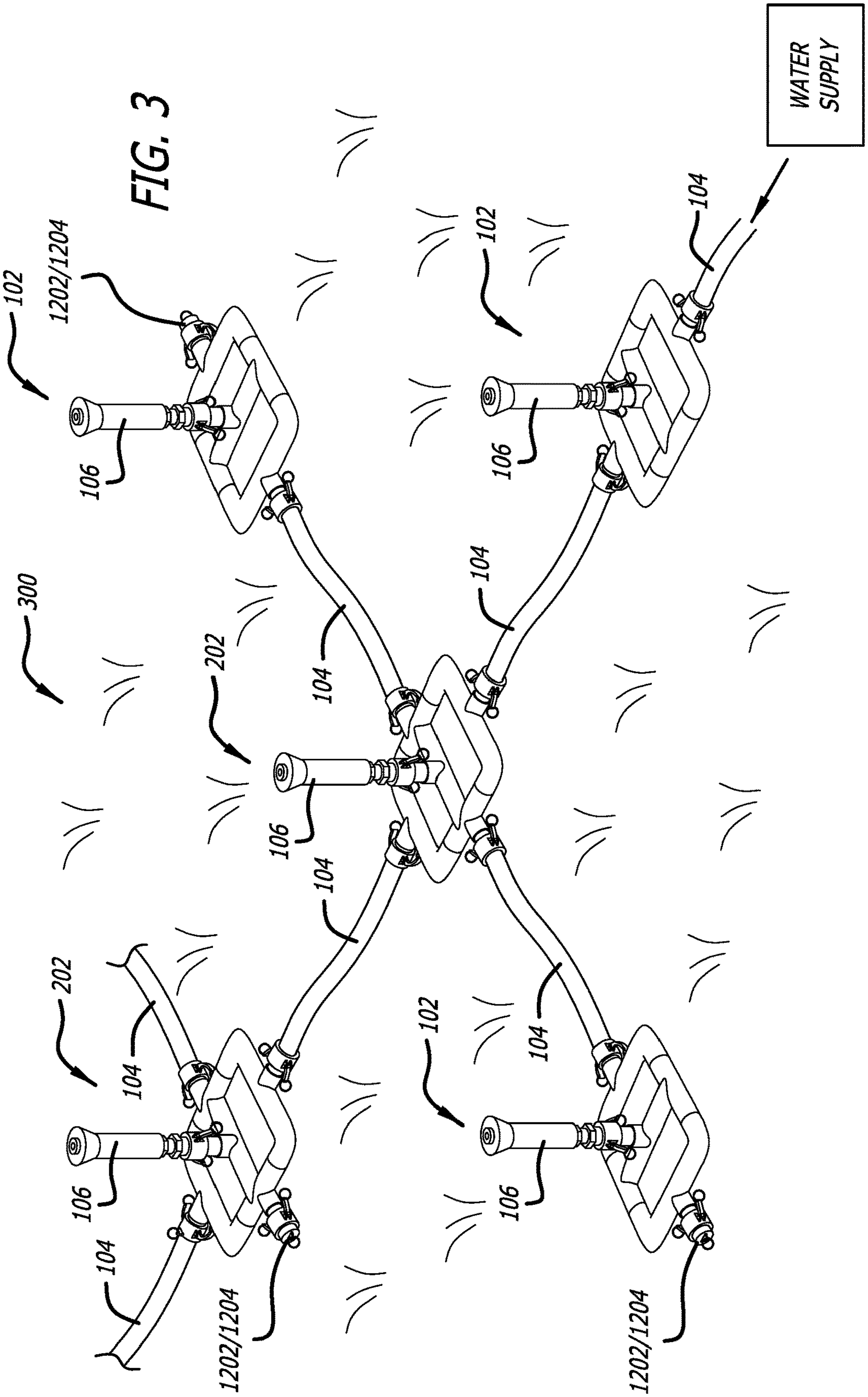
FIG. 3 is a perspective view of one example of an irrigation system having a plurality of interconnected base and hub assemblies in combination.

FIG. 3 is a perspective view of yet another example of an irrigation system 300, illustrating the use of the multiple base assemblies 102 in combination with the multiple hub assemblies 202 interconnected both in series and parallel by hoses 104. As illustrated in FIG. 3, the portable irrigation system 300 may include one or more assemblies 102, 202 having sprinkler heads 106 connected thereto in series and parallel by a plurality of hoses 104. The plurality of assemblies 102, 202 may all connect at one point of connection to a water supply. As illustrated in FIG. 3, the hub assemblies 202 provide for the system 100 to be able to extend to both the longitudinal and latitudinal directions. When extending outwards, base assemblies 102 and hub assemblies 202 may be interconnected on all four sides of the hub assemblies 202 to extend the system 100 outward in all directions. When extending out from the hub assembly 202, one or more additional base and/or hub assemblies 102, 202, may continue outward in series and then may be capped by cap 1202/1204 to terminate the extension.

Figure 4:
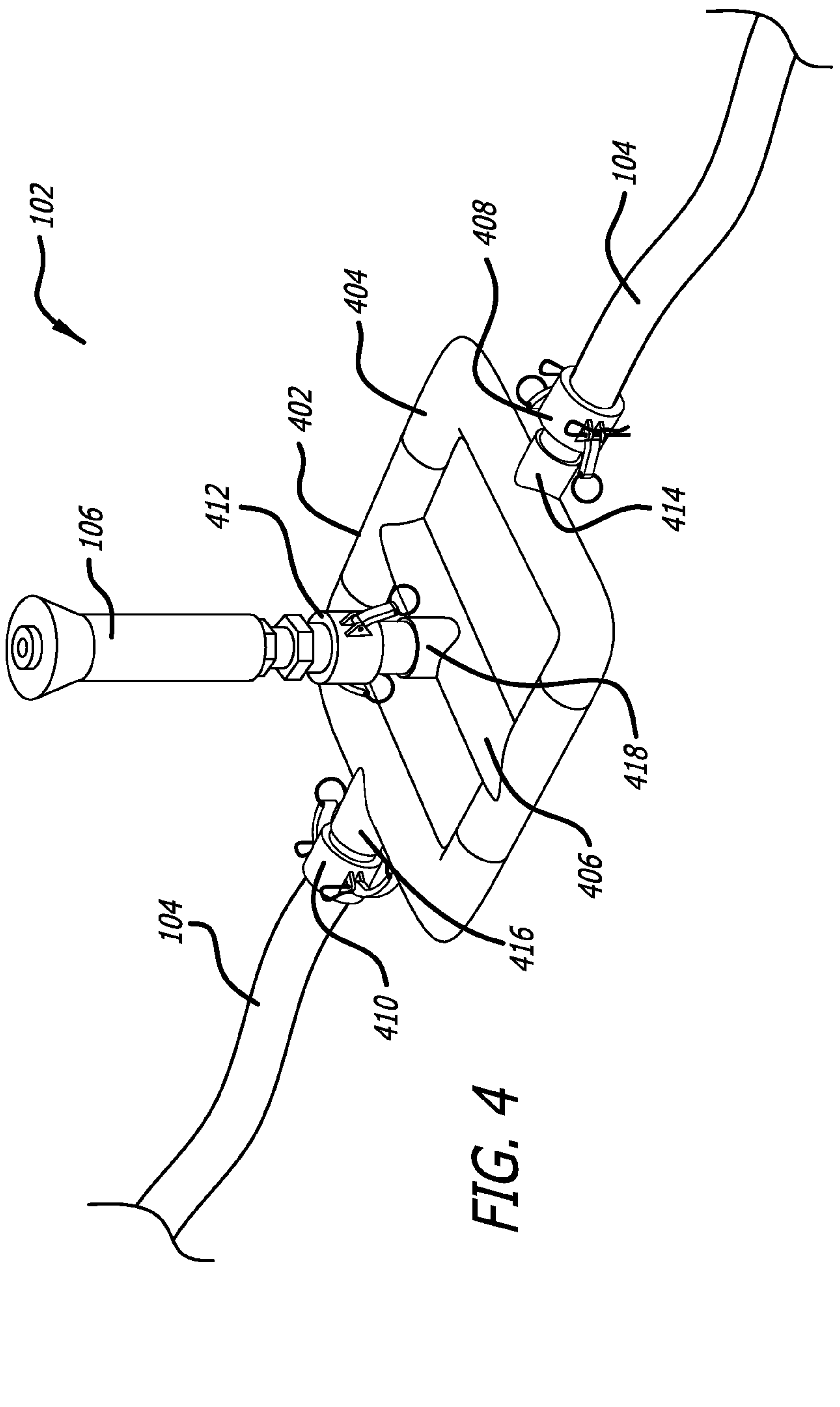
FIG. 4 is a perspective view of a single base assembly.

FIG. 4 is a perspective view of a single base assembly 102 interposed between two hoses 104. The single base assembly 102 may include a base 402, a cam-lock connector 412, and a sprinkler head 106. As illustrated in FIG. 4, the base 402 includes a perimeter channel 404 and at least one central channel 406. The perimeter channel 404 and the at least one central channel 406 are hollow, generally tubular members that allow fluid flow and fluid communication freely between the at least one central channel 406 and the perimeter channel 404. The perimeter channel 404 includes two openings, an inlet opening 414 and outlet opening 416, each opening being capable of receiving or discharging fluid. The inlet opening 414 is positioned on one side of the perimeter channel 404 of the base 402 at the center of the side of the base 102, while the outlet opening 416 is positioned on the opposite side of the perimeter channel 404 of the base 402 from the inlet opening 414 at the center of the opposite side of the base 102. The two openings 414, 416 are connected to hoses 104 by cam-lock connectors 408, 410. The central channel 406 includes one opening 418 (i.e., a fluid irrigation opening) positioned at the center of the central channel 406. The opening 418 is connected to the sprinkler head 106 by cam-lock 412.

While the base 402 and hub 602 (shown in FIG. 6) are shown to be a square shape, those having skill in the art may recognize that the base 402 and/or hub 602 may consist of any shape including but not limited to a rectangle or circle. Further, the central channel 406 could also be positioned diagonally or in another orientation across the perimeter channel 404 without departing from the scope of the invention. Similarly, if the central channel 406 are positioned diagonally across the perimeter channel 404, the inlet opening 414 and outlet opening 416 may be positioned on the opposing corners of the base 404 opposite the central channel 406.

Figure 5:
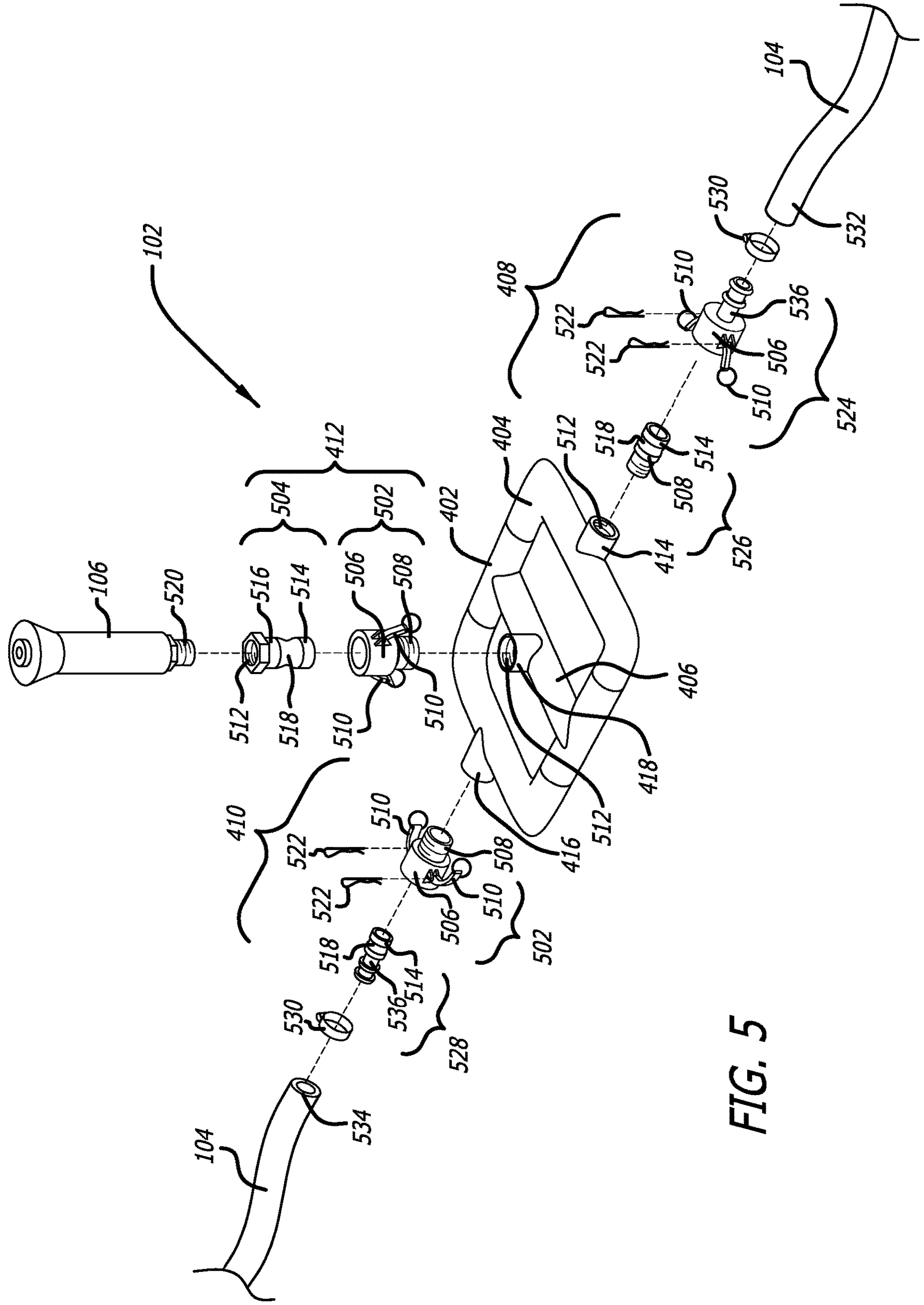
FIG. 5 is an exploded view of the single base assembly of FIG. 4.

FIG. 5 is an exploded view of a single base assembly 102 as shown in FIG. 4 interposed between two hoses 104. The sprinkler head 106 is connected to the opening 418 positioned at the center of the central channel 406 of the base 402 by a cam-lock connector 412. Cam-lock connector 412 and any cam-lock connector described in accordance with the present invention has a hollow body to permit fluid to flow therethrough.

Cam-lock connector 412 includes a cam 502 and groove fitting 504. The cam 502 has two ends; a female coupler end 506 having cam levers 510 and an external male threading end 508 on the opposing end for engaging with the female internal threading 512 of the opening 418. The groove fitting 504 also has two ends; a male adapter end 514 having an external circumferential groove 518 and a female nut end 516 having female internal threading 512 on the opposing end for receiving the male external threading 520 of the sprinkler head 106. The male adapter end 514 of the groove fitting 504 inserts into the female coupler end 506 of the cam 502 to form a cam-lock connector 412. Rotation of cam levers 510 from a disengaged position to a locked position causes the distended portion of the cams (not shown) to wedge against the external circumferential groove 518 of the male adapter end 514 to lock the cam 502 and groove fitting 504 together. When cam levers 510 are in a locked position, cam pins 522 may then be inserted into cam holes 806 (FIG. 8A) to prevent inadvertent decoupling of cam-lock connector 412.

The hoses are connected to the inlet and outlet openings 414, 416 positioned on opposite sides of the perimeter channel 404 of the base 402 by cam-lock connectors 408, 410. Cam-lock connector 408 comprises a cam 524 and groove fitting 526. The cam 524 has two ends; a female coupler end 506 having cam levers 510 and a hose shank end 536 on the opposing end for inserting into the hose opening end 532 of hose 104. A tight seal is created between the hose opening end 532 and the inserted hose shank end 536 of cam 524 by hose clamp 530. The groove fitting 526 has two ends; a male adapter end 514 having an external circumferential groove 518 and an external male threading end 508 on the opposing end for engaging the female internal threading 512 of the inlet opening 414. The male adapter end 514 of the groove fitting 526 inserts into the female coupler end 506 of the cam 524 to form a cam-lock connector 408. Rotation of cam levers 510 from a disengaged position to a locked position causes the distended portion of the cams (not shown) to wedge against the external circumferential groove 518 of the male adapter end 514 of groove fitting 526 to lock cam 524 and groove fitting 526 together. When cam levers 510 are in a locked position, cam pins 522 may then be inserted into cam holes 806 (FIG. 8A) to prevent inadvertent decoupling of cam-lock connector 408.

Cam-lock connector 410 comprises a cam 502 and groove fitting 528. The external male threading end 508 of cam 502 engages with the female internal threading (not shown) of the outlet opening 416. The groove fitting 528 has two ends; a male adapter end 514 having an external circumferential groove 518 and a hose shank end 536 on the opposing end for inserting into the hose opening end 534 of hose 104. A tight seal is created between the hose opening end 534 and the inserted hose shank end 536 of groove fitting 528 by hose clamp 530. The male adapter end 514 of groove fitting 528 inserts into the female coupler end 506 of cam 502 for accepting cams to form a cam-lock connector 410. Rotation of cam levers 510 from a disengaged position to a locked position causes the distended portion of the cams to wedge against the external circumferential groove 518 of the male adapter end 514 to lock the cam 502 and groove fitting 528 together. When cam levers 510 are in a locked position, cam pins 522 may then be inserted into cam holes 806 (FIG. 8A) to prevent inadvertent decoupling of cam-lock connector 410.

Figure 6:
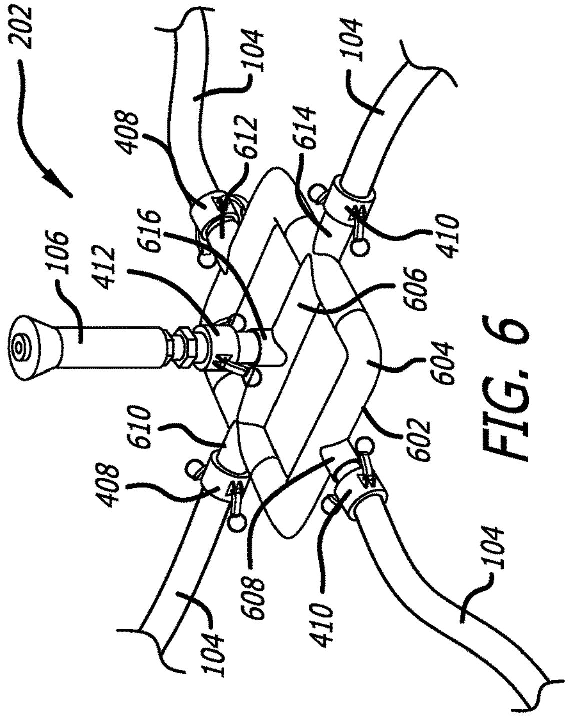
FIG. 6 is a perspective view of a single hub assembly.

FIG. 6 is a perspective view of a single hub assembly 202 interposed between four hoses 104. The single hub assembly 202 may include a hub 602, cam-lock connector 412, and sprinkler head 106. As illustrated in FIG. 6, the hub 602 includes a perimeter channel 604 and one central channel 606. Perimeter channel 604 includes openings, 608, 610, 612, 614, each opening being capable of either receiving or discharging fluid. Each of the openings 608, 610, 612, 614 is positioned on different sides of perimeter channel 604 of hub 602 at the center of the perimeter sides of the hub. Openings 608, 610, 612, 614 are connected to hoses 104 by cam-lock connectors 408, 410. Central channel 606 includes one opening 616 positioned at the center of the central channel 606. Opening 616 is connected to sprinkler head 106 by cam-lock 412.

Figure 7:
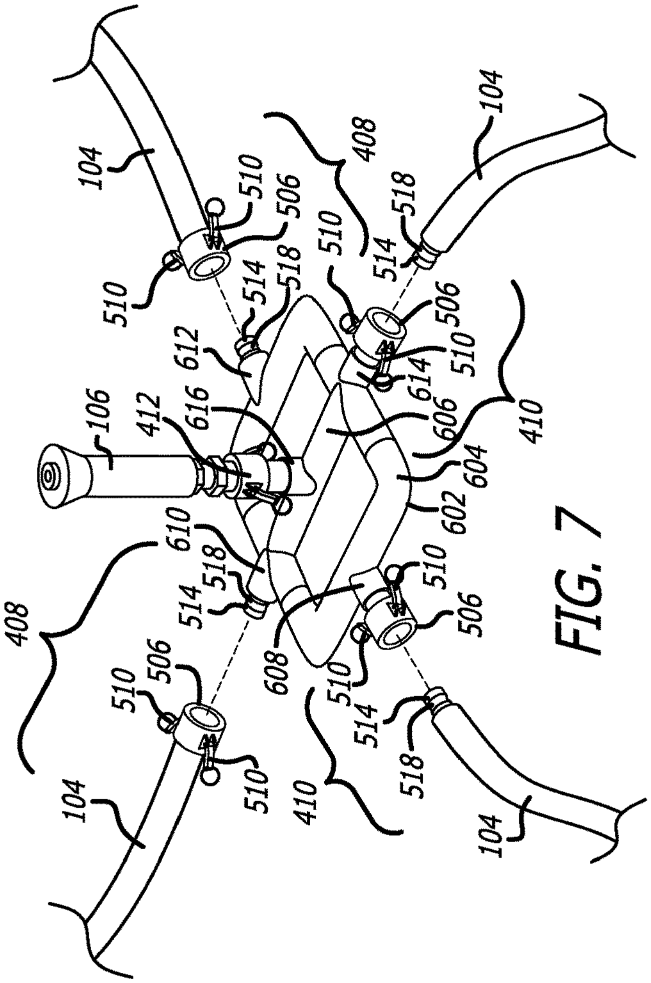
FIG. 7 is an exploded view of the single hub assembly of FIG. 6.

FIG. 7 is an exploded view of the single hub assembly 202 as shown in FIG. 6 interposed between four hoses 104. Similar to the single base assembly 102 shown in FIG. 5, cam-lock connector 412 connects sprinkler head 106 to the opening 616 positioned at the center of the central channel 606 of hub 602. Cam-lock connector 412 comprises the same parts and connects hose 104 to opening 616 of hub 602 in the same manner as the connection between the hose 104 to the opening 418 of the base 402 described in FIG. 5 above.

Hose 104 is connected to openings 608, 614 positioned on the perimeter channel 604 of hub 602 by cam-lock connectors 410. Similar to the single base assembly 102 shown in FIG. 5, cam-lock connectors 410 include the same parts and connect the hose 104 to openings 608, 614 of hub 602 in the same manner as the connection between the hose 104 to the opening 416 of the base 402 described in FIG. 5 above.

Hose 104 is connected to openings 610, 612 positioned on the perimeter channel 604 of hub 602 by cam-lock connectors 408. Similar to the single base assembly 102 shown in FIG. 5, cam-lock connectors 408 includes the same parts and connect the hose 104 to openings 610, 612 of hub 602 in the same manner as the connection between the hose 104 to the opening 414 of the base 402 described in FIG. 5 above.

Figure 8A:
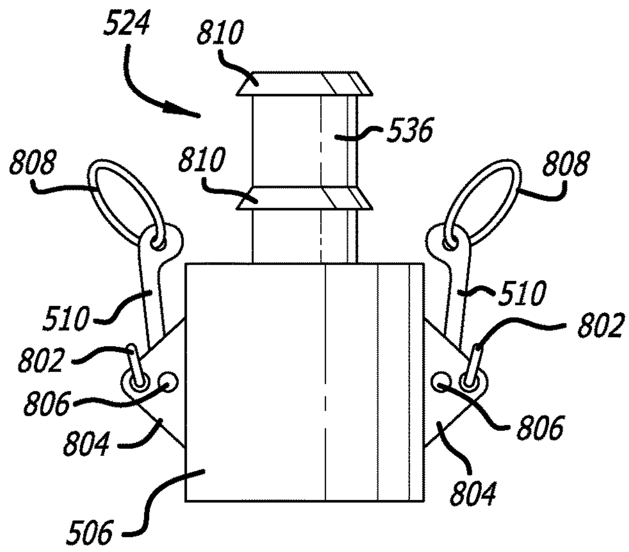
FIG. 8A is a front view of a cam having a female coupler end and hose shank end.
Figure 8B:
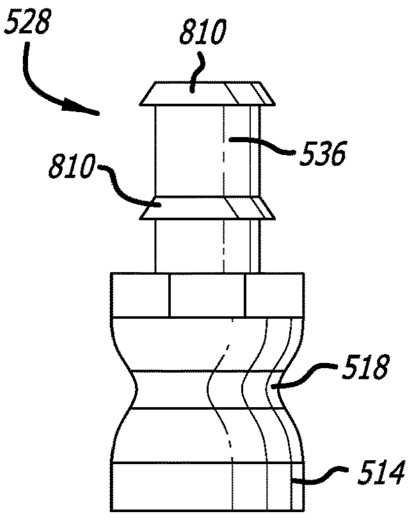
FIG. 8B is a front view of a groove fitting having a male adapter end and hose shank end.

FIGS. 8A and 8B illustrate male and female cam-lock parts 524, 528 having hose shanks 536 for insertion into hose openings 534. FIG. 8A is a front view of cam 524. Cam 524 comprises two ends; a female coupler end 506 and a hose shank end 536 on the opposing end for inserting into hose openings 534.

As illustrated in FIG. 8A, the female coupler end 506 utilizes two cam levers 510 whereby two cutouts 804 and two pivot pins 802 located on the associated cutout 804 are provided on the outer end of the female coupler end 506. Each of the cam levers 510 is detachably fastened by the associated pivot pin 802 in associated cut out 804 in the female coupler end 506 for pivoting movement about its pivot pin 802. Distended portion of the cam levers 510 (not shown) are provided at the inner end of cam levers 510 to engage the circumferential groove 518 of the male adapter end 514 when inserted into the female coupler end 506 of the cam 524, to lock the female coupler end 506 to the male adapter end 514 when the cam levers 510 are swung towards the outer end of the female coupler end 506. Illustrated in FIG. 8A are cam levers 510 in a locked position.

To disconnect the female coupler end 506 from the male adapter end 514 a pull ring 808 is further provided at the outer end of each cam lever 510 to assist a user to disconnect the female coupler end 506 from a male adapter end 514 by pivoting the cam levers 510 about their pivot pins 802 toward the outer end of the female coupler end 506. When cam levers 510 are in the locked position, a cam pin 522 may be inserted into each cam hole 806 in cutout 804 to restrict pivotal movement of cam levers 510 to disconnect the female coupler end 506 from a male adapter end 514. As further illustrated in FIG. 8A, the hose shank end 536 includes two spaced apart external circumferential ribs 810 for engaging with interior walls of hose openings to create a seal for preventing fluid leakage.

FIG. 8B is a front view of groove fitting 528. Groove fitting 528 has two ends; a male adapter end 514 and a hose shank end 536 on the opposing end for inserting into hose openings. As illustrated in FIG. 8B, male adapter end 514 comprises an external circumferential groove 518 for engaging distended portions of the cam levers 510. Similar to cam 524 as described above in FIG. 8A, hose shank end 536 comprises two spaced apart external circumferential ribs 810 for engaging with interior walls of hose openings to create a seal for preventing fluid leakage.

Figure 9A:
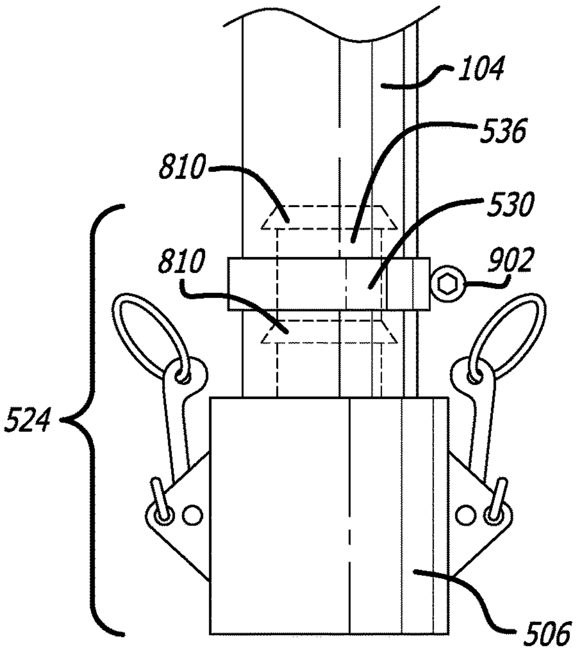
FIG. 9A is a front view of the cam of FIG. 8A connected to a hose.
Figure 9B:
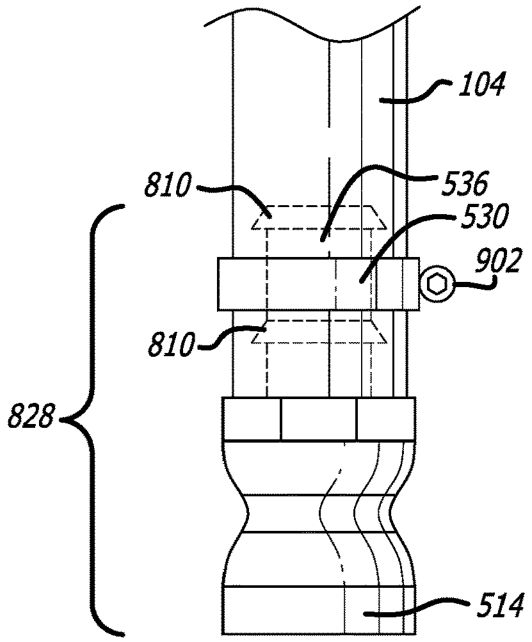
FIG. 9B is a front view of the groove fitting of FIG. 8B connected to a hose.

FIGS. 9A and 9B illustrate cam 524 and groove fitting 528 inserted into hose 104. Both FIGS. 9A and 9B illustrate hose clamp 530 positioned between external circumferential ribs 810 of hose shank 536. Each hose clamp 530 comprises a worm hole 902 for adjusting the hose clamp's diameter to precisely apply sealing pressure to ensure a tight seal between the hose shank 536 and hose 104.

Figure 10:
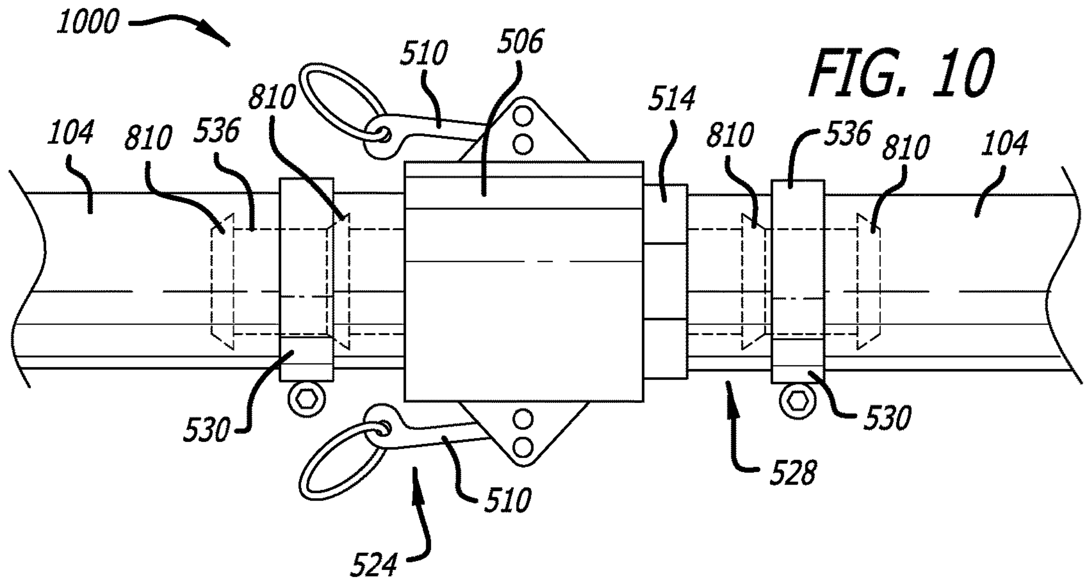
FIG. 10 is a front view of the cam connected to a hose of FIG. 9A connected to the groove fitting connected to a hose of FIG. 9B by cam-lock connection.

FIG. 10 illustrates female coupler end 506 of the cam 524 of FIG. 9A in locked connection with the male adapter end 514 of the grooved fitting of FIG. 9B to create cam-lock connection 1000 between hoses 104. As illustrated in FIG. 10, cam-lock connection 1000 comprises cam 524, which is attached to hose conduit 104 by the insertion of hose shank 536 having two circumferential ribs 810 into the interior opening of hose 104 to create a leak-tight seal, and groove fitting 528, which is also attached to a separate hose conduit 104 by the insertion of hose shank 536 having two circumferential ribs 810 into the interior opening of hose 104 to create a leak-tight seal. Further pressure may be applied to the seals by tightening hose clamp 530, which may be positioned between the two circumferential ribs 810 of hose shank 536 of cam 524 and groove fitting 528. Pair of cam levers 510 are pivotally mounted on female coupler end 506 of cam 524. Cam-lock connection 1000 is illustrated in its locked position wherein the outer ends of cam levers 510 are swung towards the outer end of female coupler end 506. In this position, distended portions (not shown) if the cam levers 510, located on the inner ends of cam levers 510, are engaged with the circumferential groove of male adapter end 514. The female coupler end 506 and male adapter end 514 are thus locked in coupled relation to create cam-lock connection 1000 between hoses 104.

Figure 11:
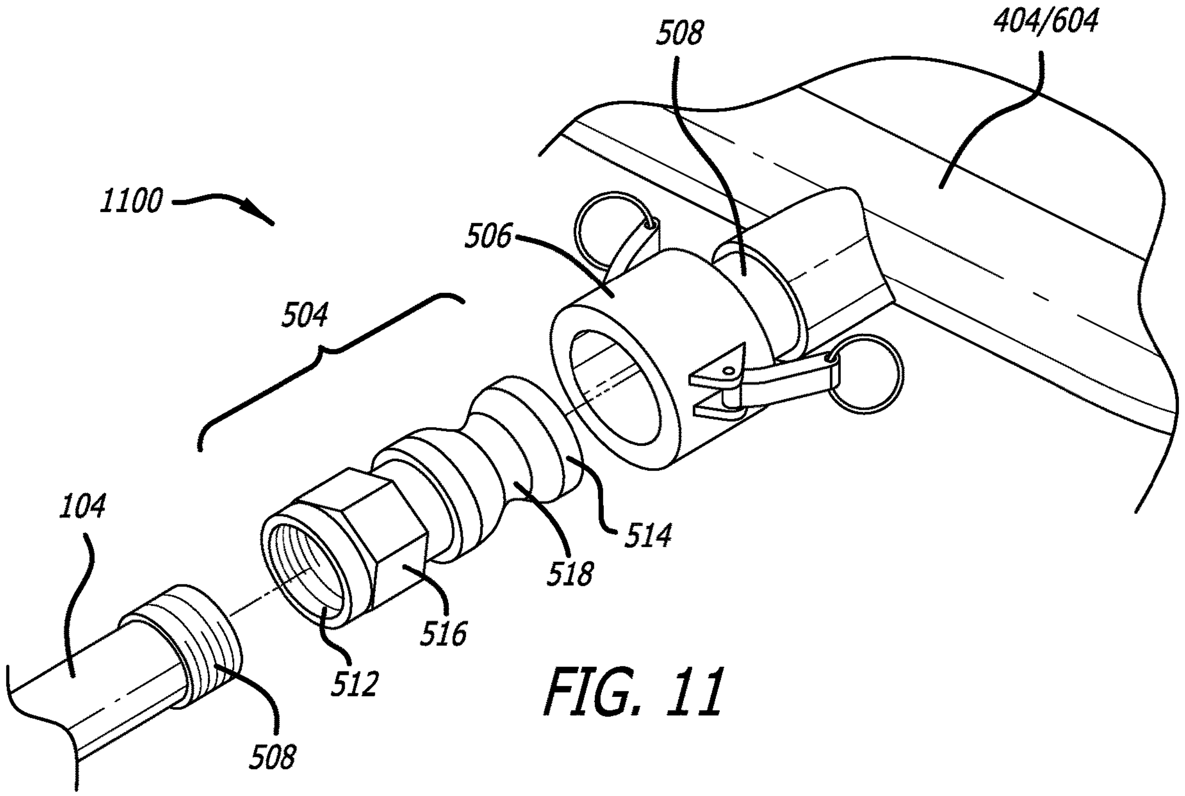
FIG. 11 is an exploded view of a base or hub opening connected to a hose having external male threading on one end by cam-lock connection.

FIG. 11 is an exploded view of hose 104 having a male external threading end 508 in connection with an opening in either the perimeter channel 404, 604 of base or hub 402, 602 by cam-lock connector 1100. As illustrated in FIG. 11, cam-lock connector 1100 comprises a cam 506 having a female coupler end 506 and male external threading end 508 (male external threading end 508 is shown inserted into opening in either perimeter channel 404, 604). The groove fitting 504 has a male adapter end 514 having an external circumferential groove 518 and a female nut end 516 having female internal threading 512 on the opposing end for receiving the male external threading end 508 of hose 104. The male adapter end 514 of groove fitting 504 inserts into female coupler end 506 for accepting cams to form cam-lock connector 1100.

Figure 12:
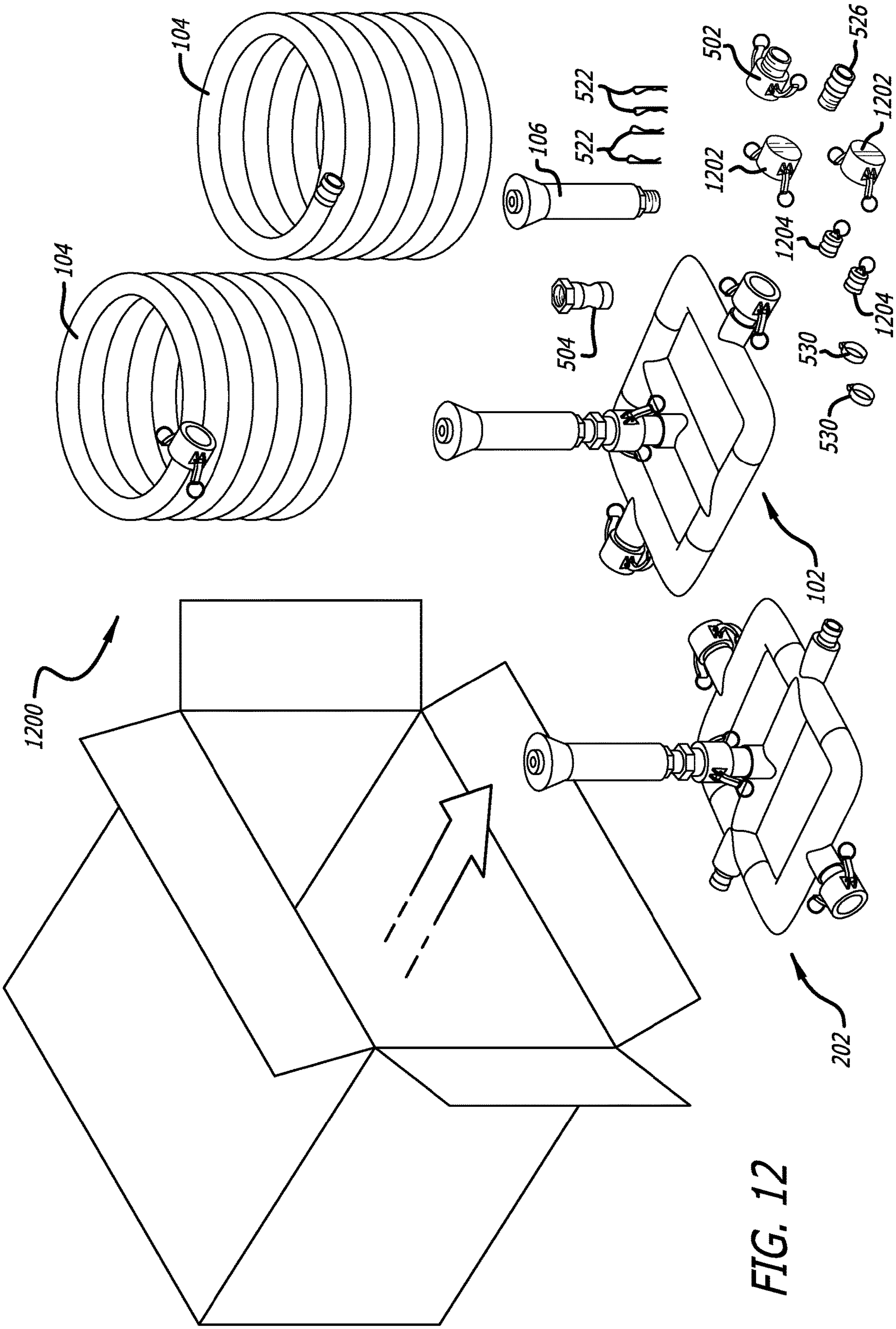
FIG. 12 is a perspective view of one example of a portable irrigation kit that can be sold in accordance with the present invention.

FIG. 12 is a perspective view of one example of a portable irrigation system kit 1200 that can be sold in accordance with the present invention. As illustrated in FIG. 12, portable irrigation system kit 1200 may include hoses 104, hub assemblies 202, base assemblies 102, sprinkler head(s) 106, groove fittings 504, cams 502, groove fittings 526, caps 1202 (caps 1202 having two ends; a female coupler end on one end and cap on the opposing end), plugs 1204 (plugs 1204 having two ends; a male adapter end on one end and plug or cap on the opposing end), hose clamps 530, and cam pins 522. In some examples, a portable irrigation system kit in accordance with the present invention may include different numbers of parts described above, different parts in different multiples, and/or any combinations thereof. It is possible to customize a kit for use over specific area or for a specific application, thereby getting customized ordered parts in a kit.

Notwithstanding the various examples presented above, the base and hub assemblies 102, 202 can be used alone or in any combination. Different sizes and shapes of bases and hubs 402, 602 may be used having different channel diameters as commonly recognized and used in the art. Hoses having different diameters and lengths may also be used in any combination with base and hub assemblies, alone or in combination. Additionally, a variety of different sprinkler heads and nozzles having different precipitation rates and that can irrigate at different distances may be connected to either the base and hub assemblies 102, 202. These sprinkler heads and nozzles may include, but are not limited to, MP Rotators, Side Strips, Bubblers, and Fixed Arc Nozzles. In some examples, sprinkler heads may have internal female threads for engaging a male external threading for connecting to bases and/or hubs. Furthermore, drip emitters may also be connected to base and hub assemblies 102, 202 to create a portable drip irrigation system. Further, other examples of the irrigation systems 100, 200, 300, 1200 of the present invention may incorporate sprinkler heads capable of being angled at various degrees with respect to the ground surface. More than one water supply may also be utilized in accordance with irrigation system of the present invention and different orientation of the bases and/or hubs with respect to the water supply may be utilized such that any opening on the base and/or hub may act as an inlet opening and/or outlet opening. While the cam fitting parts described above entail a female coupler end one end and either an opposing external male threading end (502), hose shank end (524), or capped end (1202), cam fittings may also entail a female coupler end with an opposing internal female threading end for connected two male parts with one another. It should further be recognized that any cam fitting described above can be connected with any groove fitting described above to create a cam-lock connection. Thus, all cam and groove fittings can be used interchangeably with one another to create various different cam-lock connections. For example, a sprinkler head having internal female threading may be connecting to an opening on a base or hub also having internal female threading by a cam-lock connector that has a cam having an external male threading end (502) and a groove fitting having an external male threading end (526) to engage with either internal female threading on the sprinkler head or hub or base opening. Interchangeable cam-lock connections may also include caps 1202 and plugs 1204. Further, different sizes and dimensions of cam and groove fittings and caps and plugs may be used in accordance with the present invention, including but not limited to ¾", 1", 1¼", 1½", 2", 3", and 4" diameters. It is also recognized that other connectors, aside from cam-lock connectors, may be used to connect the various parts of the present invention. It is further recognized that a plurality of inlet and outlet openings may be included in either the base or hub assemblies and may be positioned at different points along the base or hub without departing from the scope of the invention.

Again, while the base 402 and hub 602 are shown to be a square shape, those having skill in the art may recognize that the base 402 and/or hub 602 may consist of any shape including but not limited to a rectangle or circle. Further, the central channel 406 could also be positioned diagonally or in another orientation across the perimeter channel 404 without departing from the scope of the invention. The base 402 and hub 602 may further include more than one central channel 406 that may intersect one another or be positioned to be parallel to one another. It is not necessary that the center channel intersect the center of the base, just that it be positioned within the center of the perimeter channel 404. Similarly, if the central channel 406 are positioned diagonally across the perimeter channel 404, the inlet opening 414 and outlet opening 416 may be positioned on the opposing corners of the base 404 opposite the central channel 406.

The descriptions of the various implementations presented above are for purposes of illustration only. The description is not exhaustive and does not limit the claimed invention to the precise forms disclosed. Modifications and variations are possible in light of the description below, or may be acquired from practicing the invention. The claims and their equivalents define the scope of the invention.

What is claimed is:

1. A portable irrigation system that receives water from a water supply for providing irrigation from a water supply to a defined surface area of turf, the portable irrigation system comprising:

a sprinkler head;

a first and second hose; and at least one base assembly, the base assembly including at least one base having a base perimeter channel and base central channel, wherein the base perimeter channel and base central channel are hollow and interconnected to allow fluid to flow freely between the base perimeter channel and base central channel, wherein the base perimeter channel includes at least one base inlet opening for connecting to the water supply and allowing the fluid to enter the base assembly from the water supply and at least one base outlet opening for the fluid from the water supply to exit the base assembly, wherein the at least one base inlet opening connects to the first hose and the at least one base outlet opening connects to the second hose, wherein the direction of fluid when it flows into the at least one base inlet opening from the water supply is perpendicular to the direction of fluid that flows through the base central channel from the water supply, and wherein the base central channel includes at least one base fluid irrigation opening on the top of the central channel for connecting to the sprinkler head, whereby the sprinkler head, when attached to the central channel, expels water upward and outward from the sprinkler head to provide irrigation to the defined surface area of turf extending beyond the portable irrigation assembly.

2. The portable irrigation system of claim 1, wherein the portable irrigation system further includes at least one hub assembly, wherein the at least one hub assembly includes a hub having a hub perimeter channel and hub central channel, wherein the hub perimeter channel includes one hub inlet opening and at least two separate hub outlet openings, and wherein the hub central channel includes at least one hub fluid irrigation opening.

3. The portable irrigation system of claim 1, wherein the portable irrigation system further includes a plurality of cam locks.

4. The portable irrigation system of claim 1, wherein the portable irrigation system further includes at least one cap.

* * * * *